W. HEER.
PLANT FOR STORING EXPLOSIVE LIQUIDS.
APPLICATION FILED NOV. 5, 1907.
946,041.
Patented Jan. 11, 1910.
6 SHEETS—SHEET 1.
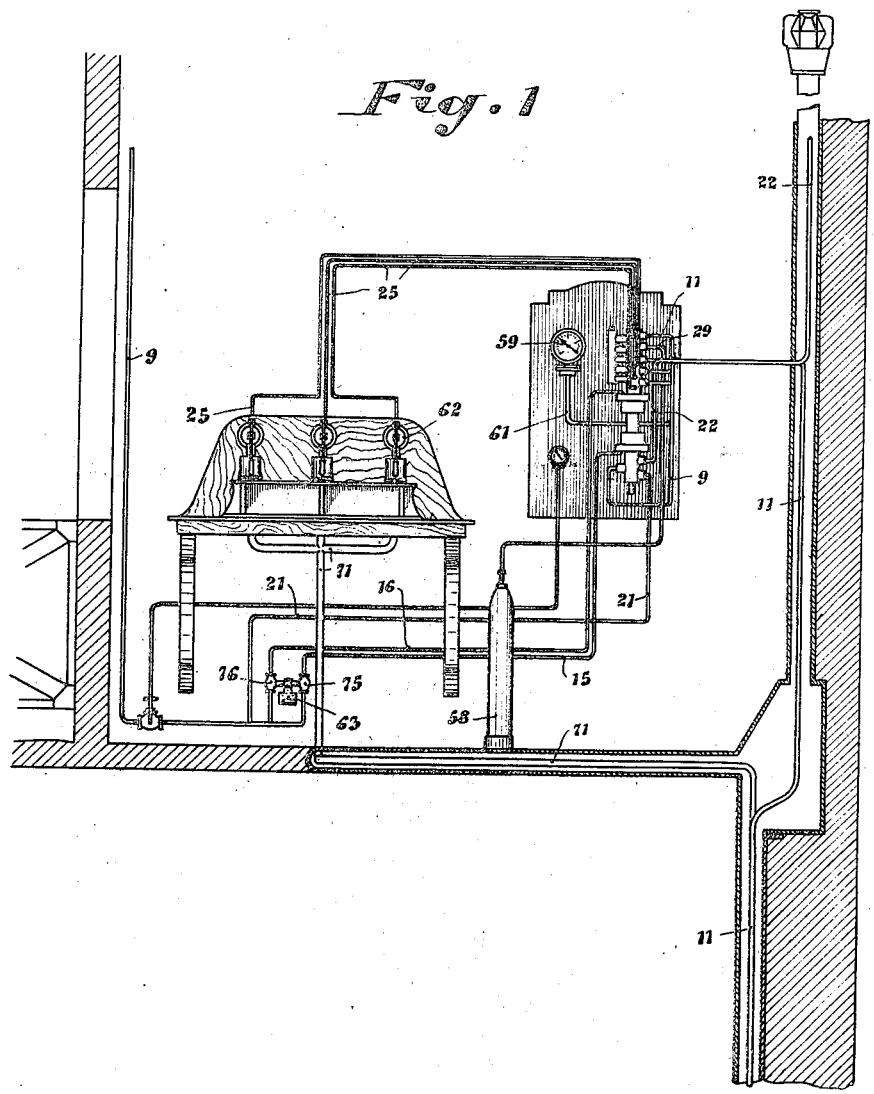

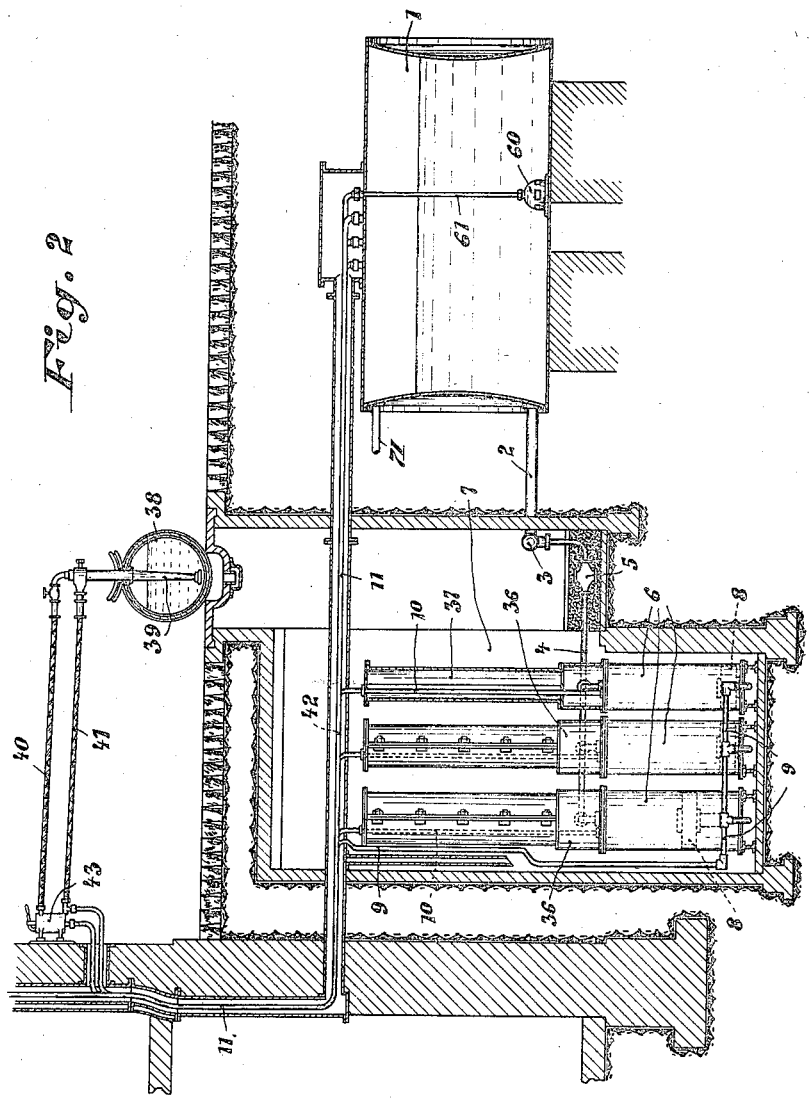

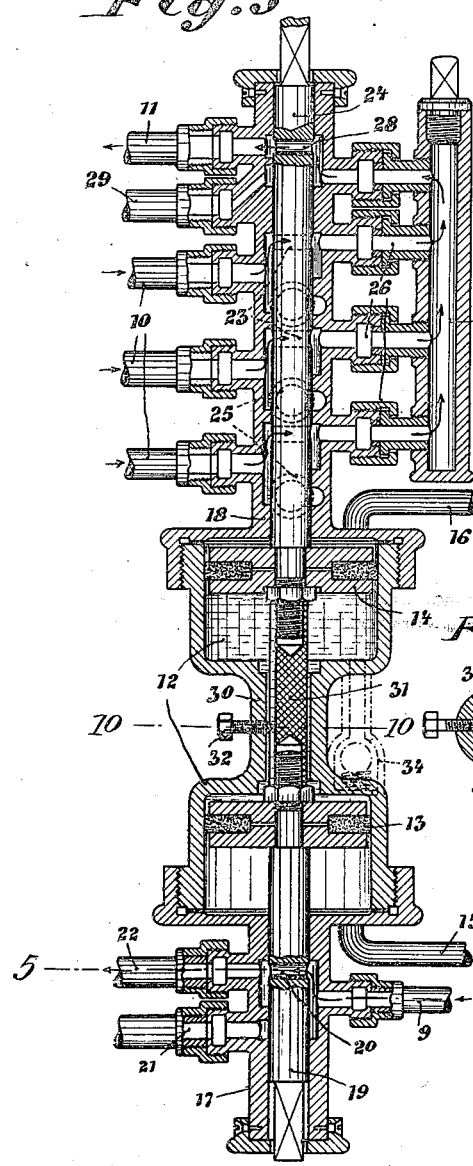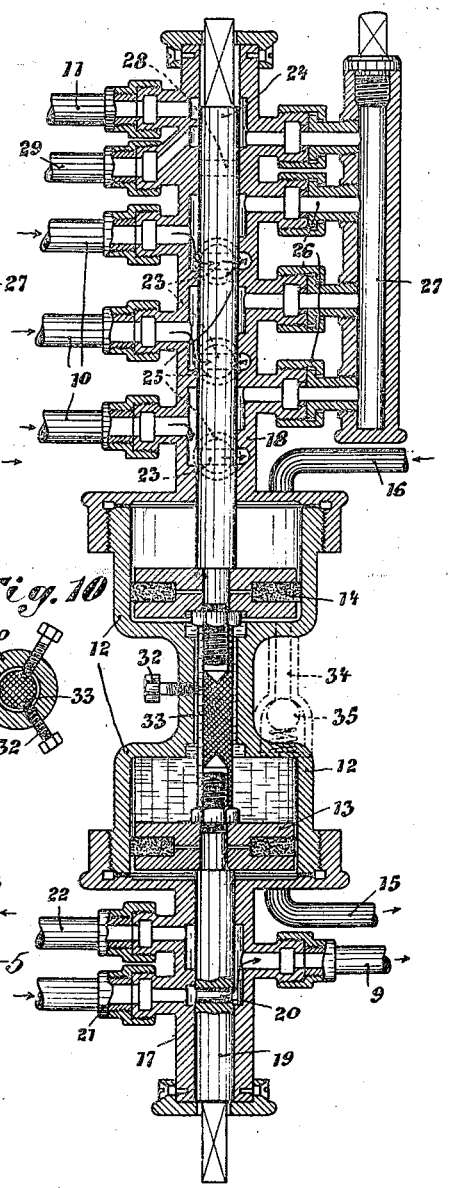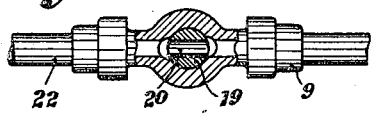

W. HEER.
PLANT FOR STORING EXPLOSIVE LIQUIDS.
APPLICATION FILED NOV. 5, 1907.
946,041.
Patented Jan. 11, 1910.
6 SHEETS—SHEET 4.
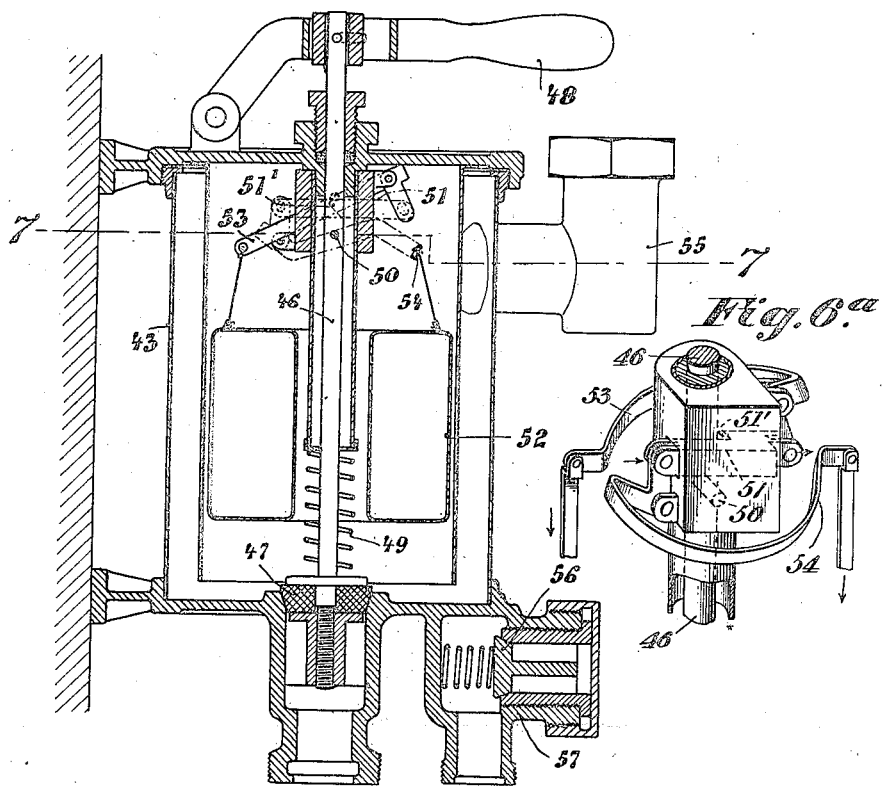
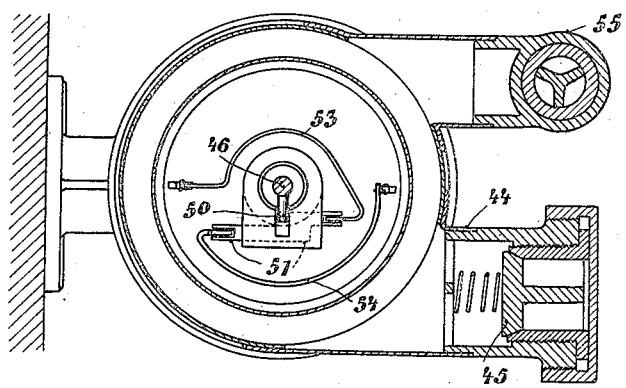
Witnesses:
Arthur E. Jumper
August Miner
Inventor:
Wilhelm Heer

W. HEER.
PLANT FOR STORING EXPLOSIVE LIQUIDS.
APPLICATION FILED NOV. 5, 1907.

946,041.

Patented Jan. 11, 1910.
6 SHEETS—SHEET 5.

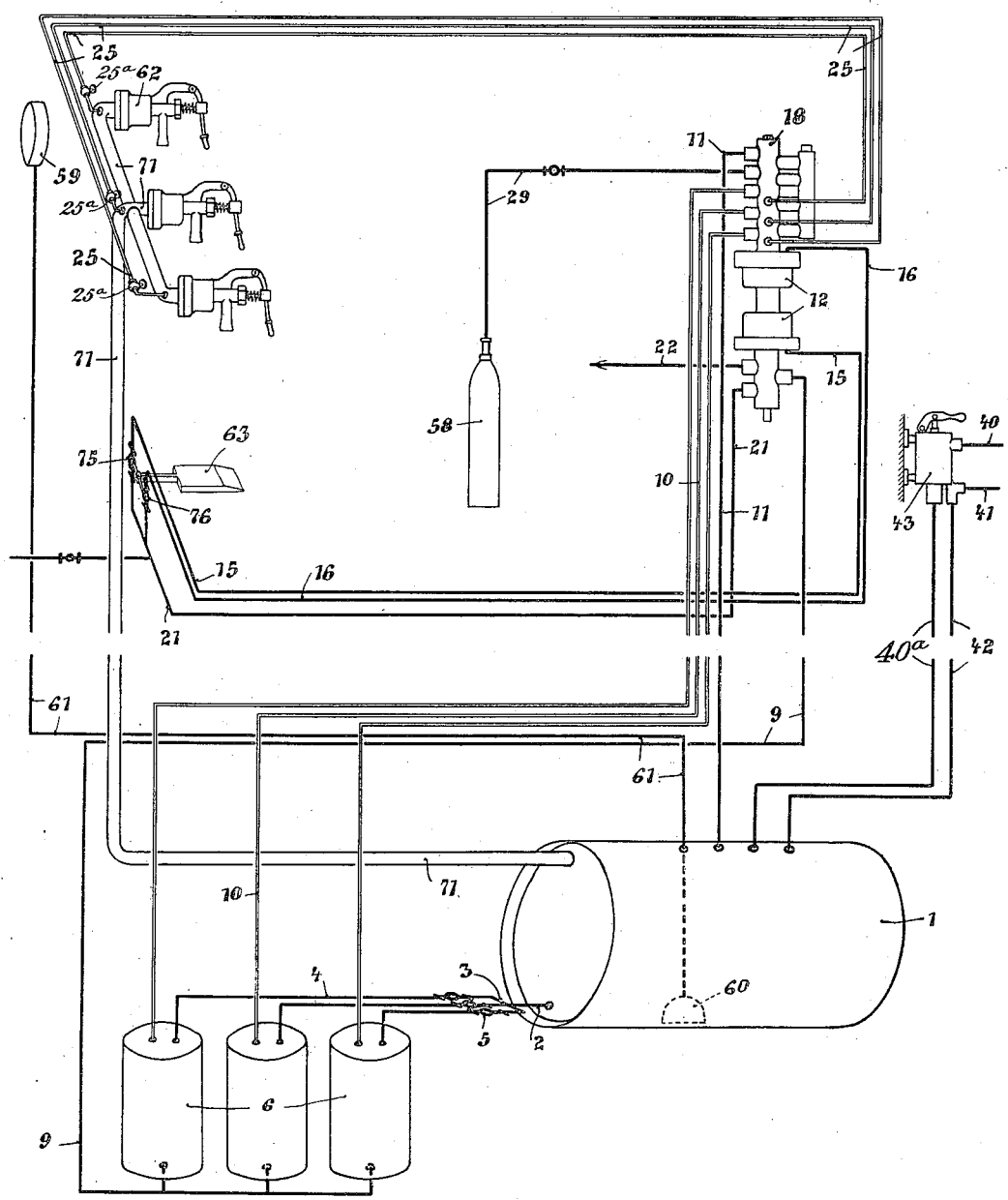

UNITED STATES PATENT OFFICE.

WILHELM HEER, OF BOCHUM, GERMANY.

PLANT FOR STORING EXPLOSIVE LIQUIDS.

946,041.

Specification of Letters Patent. Patented Jan. 11, 1910.

Application filed November 5, 1907. Serial No. 400,841.

*To all whom it may concern:*

Be it known that I, WILHELM HEER, a citizen of the German Empire, and resident of Bochum, Germany, have invented new and useful Improvements in Plants for Storing Explosive Liquids, of which the following is a specification.

This invention relates to novel means for storing explosive liquids in tanks placed underground, so that the liquids are protected against explosions, fire and lightning.

The invention relates more particularly to improved means for withdrawing any desired quantity of the stored liquid without exposing the storage tank to any pressure. In this way leakage of the tank is prevented, so that troublesome and expensive repairs of the same are obviated.

The invention further comprises novel means for readily discharging the contents of the supply barrels into the main tank.

Briefly stated, the explosive liquid stored in the main tank is first allowed to flow into and fill a number of auxiliary tanks arranged at a lower level than the main tank and containing an inert protective gas, such as carbonic acid gas. From the auxiliary tanks the liquid is conveyed, by a suitable pressure medium, to the discharge faucets arranged overground, the return of the liquid from the auxiliary tanks into the main tank being prevented by suitable back pressure valves. While filling the auxiliary tanks, the liquid withdrawn from the main tank will be replaced by the carbonic acid gas forced out of the former by the entering liquid. The necessary connections between the main tank, the auxiliary tanks and the discharge faucets at the different stages of the operation are established by means of a pair of pistons which are operated by compressed air. In order to insure the siphonic flow of the liquid from the supply barrel into the storage tank, the connecting pipe is at its highest point provided with a valve which closes automatically when a barrel is emptied, and thus maintains the contents of the discharge pipe suspended, so that the siphonic action is automatically restarted when a new barrel is coupled to the valve.

Figure 8:
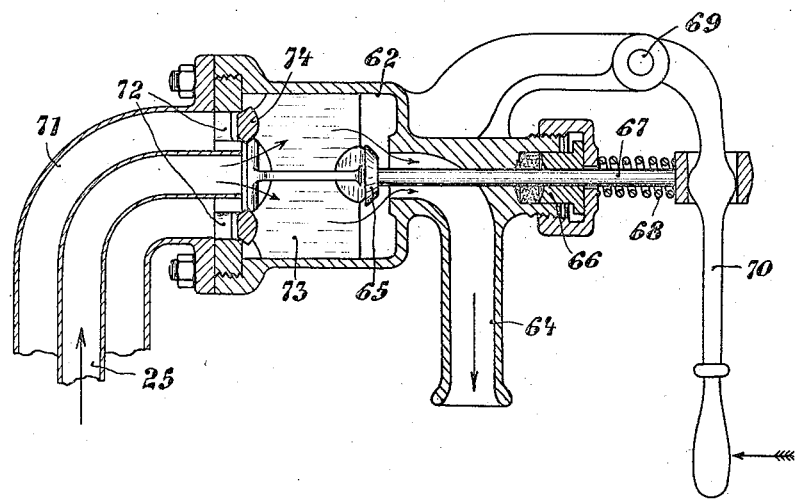
Figure 9:
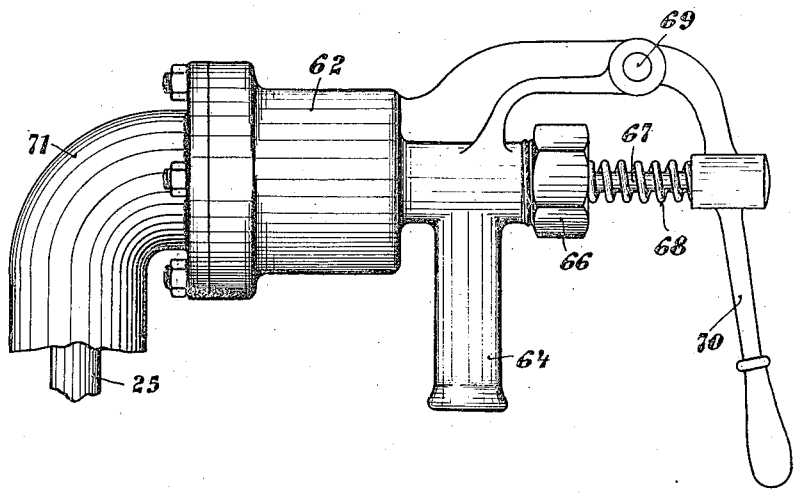

In the accompanying drawings: Figure 1 is an elevation, partly in section, of the upper part of my improved liquid storage plant; Fig. 2 a similar view of the lower part thereof; Fig. 3 a longitudinal section through the liquid distributing means; Fig. 4 a similar view, showing the parts in a different position; Fig. 5 a section on line 5—5, Fig. 3; Fig. 6 a vertical section through the siphon-valve; Fig. 6ª a detail of part of Fig. 6; Fig. 7 a cross section on line 7—7, Fig. 6; Fig. 8 an axial section through the discharge faucet; Fig. 9 a side view thereof; Fig. 10 a cross section on line 10—10, Fig. 3, and Fig. 11 a diagram, showing the various tanks and other devices, together with their connections.

The numeral 1 indicates a main tank arranged underground and adapted to be filled with the explosive liquid to be stored. Tank 1 communicates by pipe 2 with a cross pipe 3 which is, in turn, by branches 4, having back pressure valves 5, connected to the upper heads of a number of auxiliary tanks or cylinders 6 mounted in a cellar 7, so as to be readily accessible for repairs, etc. The several cylinders 6 are preferably of different predetermined capacities, so that in emptying the cylinders, different measured quantities of the liquid are discharged.

Within cylinders 6 are slidable plungers 8 which may be moved upward by a suitable pressure medium supplied through pipes 9, so as to force the liquid above said pistons through pipes 10 into the distributing device hereafter more fully described. Pipes 10 are inclosed in casings 37 mounted upon upper rims 36 of cylinders 6, casings 37 extending upward to about the liquid level in tank 1, so that any liquid accidentally leaking through pipes 10 is gathered within such casings.

The distributing apparatus consists essentially of a double cylinder comprising a pair of vertically alined single cylinders 12 connected by a neck 30. Lower cylinder 12 contains a piston 13, while within upper cylinder 12 plays piston 14. Pistons 13 and 14 are connected by a rod 31 passing through neck 30, a slight clearance being provided between rod and neck. Into the neck are tapped a suitable number of screws 32 engaging corresponding longitudinal grooves 33 of rod 31. Piston 13 has a lower stem 19 provided with a transverse bore 20, and adapted to be reciprocated within a tubular casing 17 depending from lower cylinder 12. To casing 17 are coupled a pair of pipes 21, 22, and a pressure pipe 9. Piston 14 has an upwardly extending stem 24 guided in a casing 18 secured to upper cylinder 12. To casing 18 are coupled the pipes 10 communicating with cylinders 6, and also a pair of pipes 29 and 11 leading to a carbonic acid flask 58 and to the main tank 1, respectively. At right angles to the pipes described, there are connected to casing 18 a number of pipes 25, communicating with the discharge faucets hereafter described. Opposite pipes 10 there are connected to casing 18, three pipes 26 opening into a common chamber 27. The upper end of the latter is in turn connected to the casing and may communicate through a transverse bore 28 of stem 24 with pipe 11, and consequently with main tank 1, if the stem occupies the proper position. Additional bores 23 of stem 24 are adapted to establish temporary communication between the coöperating pipes 10 and 26.

The desired movement of pistons 13, 14, and stems 19, 24, is effected by compressed air admitted into lower and upper cylinders 12, through pipes 15, 16, respectively. Cylinders 12 are connected to each other by a duct 24 which is closed by a valve 35 during the upstroke of pistons 13 and 14.

The supply barrel 38 is coupled to a connecting pipe 40, by means of a vertical pipe 39 adapted to be introduced into barrel 38 and terminating slightly above the bottom thereof, while the upper part of the barrel communicates through pipes 41, 42, with the upper part of main tank 1. Pipe 40 is controlled by a valve 47 inclosed in a housing 43, which is provided at its top with an extension 44 inclosing a valve 45 and with a charging nozzle or elbow 55 adapted for the introduction of liquid when starting the apparatus. Valve 45 is normally closed by a suitable spring, but is automatically opened by the protruding head of pipe 40 when such pipe is coupled to housing 43. At its bottom, housing 43 is provided with a similar extension 57 containing spring-influenced valve 56. Valve 47 is normally pressed downward by spring 49, and has a stem 46 which passes outward through a suitable stuffing box and is pivotally connected to a hand-lever 48. Housing 43 contains a float 52 which is connected to angle-levers 53 and 54 in any suitable manner. The latter are connected to a bolt 51, a nose 51' of which supports a pin 50 of stem 46 when the device is in operation. A pipe 40$^a$ connects the valve-controlled outlet of housing 43 with tank 1.

Next to the overground discharge faucets is arranged a pressure gage 59, the tube 61 of which communicates with a bell 60 mounted upon the bottom of tank 1. A treadle 63 is adapted to control the three-way cocks 75 and 76 of pipes 15 and 16, respectively. The discharge faucet comprises a housing 62 into which opens pipe 25 inclosed for some distance within a pipe 71 of larger diameter, such pipe being connected to the top of main tank 1 and being provided with a valve 25$^a$.

Discharge spout 64 is controlled by a valve 65 having stem 67 which passes through a suitable stuffing box 66 of housing 62. To valve 65 is connected a pair of guide plates 73 carrying annular valve 74 which is adapted to close the annular space between tubes 71 and 25 against housing 62, so that the carbonic acid contained in tank 1, above its liquid level, is prevented from entering the housing when valve 65 is off its seat. The outer end of stem 67 is engaged by a hand-lever 70 pivoted at 69, while a spring 68 encircling stem 67 tends to maintain valve 65 in its closed position.

The operation is as follows: Valve 47 is closed and housing 43 is filled, through elbow 55, with the liquid for which the apparatus is designed, whereupon pipes 40 and 41 are connected with the housing. Valve 47 is now opened by lifting handle 48, so that the liquid contained within housing 43 will rush downward through pipe 40$^a$ into main tank 1 to press the gas at the top of the latter through pipes 42, 41 into barrel 38. The piston-like action of the liquid column descending through pipe 40$^a$ produces a corresponding vacuum in pipes 40, 39 which thus starts the siphonic action desired, so that the liquid will continuously flow from barrel 38 into tank 1. During this operation, float 52 remains in its raised position and maintains stem 46 and consequently valve 47 locked in their uppermost position, by the engagement of bolt 50 with nose 51'. After all the liquid has been withdrawn from barrel 38, the liquid level in housing 43 will fall to correspondingly lower float 52. This downward movement of float 52 will, by levers 53, 54, cause bolt 50 to be withdrawn from nose 51', so as to permit spring 49 to immediately close valve 47. In this way the connection between the barrel and main tank is automatically interrupted when the barrel is emptied, while by immediately closing valve 47, the liquid column contained in pipe 40$^a$ will be prevented from flowing out of the same. Consequently the siphonic action of pipes 40, 40$^a$, may be restarted without difficulty, when a new supply barrel has been properly connected with pipes 40, 41, so as to insure the proper discharge of said barrel into main tank 1. From tank 1 the liquid flows through pipes 2, 3 and 4, into cylinder 6 and pipes 10, until the liquid assumes the same level in tank 1, cylinders 6 and pipes 10. As the pipes are inclosed within casings 37, any loss of the explosive liquid is avoided in case of leakage. It is preferred to fill casings 37 partly with an incombustible liquid, such as glycerin, so as to prevent the explosive liquid from escaping. In this way the latter is also prevented from freezing, which is very important with certain liquids, such as benzol. While cylinders 6 are thus filled, the pistons of the distributing mechanism are in their raised position, (Fig. 3), so that the inert gas contained within cylinders 6 will flow through pipes 10, ducts 23, couplings 26, chamber 27, duct 28 and pipe 11, into main tank 1. Treadle 63 is now depressed, so that air under pressure will enter pipe 16 to lower piston 14, while the air below piston 13 will escape through pipe 15 and three-way cock 75. The parts will thus assume the position illustrated in Fig. 4, so that compressed air will pass through pipe 21, duct 20, and pipes 9, into cylinders 6 below plungers 8. If one of the discharge faucets and the coöperating valve 25ª are now opened, the liquid will flow from the corresponding cylinder 6, through its pipe 10, duct 23 and pipe 25, to be finally discharged through spout 64.

It may here be stated that the valves 65 and 25ª, controlling the liquid discharge from one cylinder, must simultaneously be opened and closed, for which purpose they may be coupled in any suitable manner, (not shown). After plunger 8 has arrived in its uppermost position, the flow of the liquid will stop, and as the cylinder 6 has a known capacity, the discharged quantity of the liquid has been properly measured. The remaining cylinders 6 may now be discharged in like manner.

After one or all of the cylinders have been emptied, treadle 63 is again depressed, so that the compressed air above piston 14 may escape through pipe 16 and three-way cock 76, while air under pressure is admitted through pipe 15 into cylinder 12 below piston 13. Pistons 13 and 14 will thus ascend, so that duct 20 will establish communication between compressed air pipe 9 and discharge pipe 22, while, simultaneously, ducts 23 connect pipes 10 with chamber 27 which, in turn, has been temporarily connected with carbonic acid flask 58 through duct 28 and pipe 29. In this way plunger or plungers 8 may descend, as the compressed air escapes from pipe 9 through pipe 22, while the carbonic acid gas fills cylinders 6 above plungers 8. The latter descend by their own weight, which may be assisted by a slight over-pressure of the carbonic acid gas. After pistons 13, 14 have reached their uppermost position, the carbonic acid gas pipe 29 has again been disconnected from chamber 27, (Fig. 3), so that the tank, the cylinders and pipes which are not completely filled with the explosive liquid, contain above said liquid, the inert gas, either without any pressure or with a slight over-pressure. After pistons 13, 14, and stems 19, 24, have thus reached their raised position, the pressure in cylinders 6 and tank 1 is equalized by connecting them with each other through pipes 10, ducts 23, pipes 26, chamber 27, duct 28 and pipe 11. In this way the liquid contained in tank 1 will flow into cylinders 6 and pipes 10, until the same liquid level has been obtained.

The fact that while stem 24 descends, communication is reëstablished between carbonic acid flask 58 and chamber 27 is of no consequence, as all the empty spaces in tank, cylinders, etc., are under the same pressure. Although the upward motion of the pistons requires some time, means are provided which insure all empty spaces of the apparatus to be properly filled with carbonic acid gas while duct 28 passes pipe 29. For this purpose pistons 13, 14, are provided with a liquid brake to retard their movement, the space between said pistons being filled with a slow flowing liquid, such as glycerin. During the ascent of pistons 13, 14, the glycerin must pass from lower cylinder 12 through the narrow grooves 33 into the upper cylinder 12. By properly setting screws 32, the speed of the ascending pistons may be readily adjusted. As the retarded movement of pistons 13, 14 is required only during their ascent, while their descent may take place as rapidly as possible, the separate duct 34, controlled by spring-influenced ball valve 35, has been provided between the upper and lower cylinders 12. During the upward movement of pistons 13, 14, valve 35 will close duct 34, (Fig. 4), so that the glycerin must pass through grooves 33. When the pistons descend, the pressure of the glycerin will overcome the action of the spring influencing valve 35, so that the liquid is free to pass from upper cylinder 12, through duct 34, into the lower cylinder without any serious resistance. As it is difficult to procure a simultaneous operation of the discharge faucet and the treadle, and as, even after cutting off the compressed air at the proper time, said medium will further expand to force the liquid through small leaks of the faucet, the latter is constructed as shown in Figs. 8 and 9.

As previously described, the depression of treadle 63 causes the descent of plungers 13, 14, so as to establish communication between pipes 10 and 25, and to admit compressed air below pistons 8 through pipe 21, duct 20 and pipe 9. Simultaneously with or shortly after said depression of treadle 63, lever 70 is depressed to open valve 65, so that the liquid is discharged from pipe 25 through spout 64. Lever 70 being then released, spring 68 will seat valve 65, simultaneously lifting annular valve 74 off its seat to connect pipe 71 with casing 62. The liquid discharged from pipe 25 will thus enter pipe 71 to be returned to main tank 1. When liquid is subsequently drawn off, i. e., when valve 65 is opened, valve 74 is simultaneously closed to prevent the liquid leaving pipe 25 from entering pipe 71. After the liquid discharge operation has been carried on, in the manner described, part of the carbonic acid gas contained in tank 1, will rise through pipe 71 to fill casing 62 with said gas.

In order to permit the attendant to ascertain when cylinders 6 are properly filled, after operating treadle 63, gage 59 is provided. After the treadle has been operated, i. e., after communication has been established between the upper part of tank 1 and one or more cylinders 6, the liquid rushes in a solid stream from tank 1 into cylinders 6, and presses the carbonic acid gas from the latter into the former. As the pipes 10 and 11 are of comparatively small diameter, the pressure equalization will not take place immediately, but in cylinders 6 the carbonic acid gas will be compressed, while an underpressure will take place in tank 1. The gage pointer will thus show a considerable deviation. After the flow of the liquid has ceased, i. e., after the same liquid level has been produced in tank 1, cylinders 6 and pipes 10, equilibrium will be reëstablished. The hand will thus gradually move back toward its previous position, but will stop at such a distance from the latter as corresponds to the fall of the liquid level in tank 1. It is obvious that the deviation of the pointer produced by the reduction of pressure within tank 1, will far exceed the difference between the original and subsequent position of the pointer caused by the decrease in height of the liquid column in tank 1, so that the attendant, in observing the gage, may readily ascertain when the operation of filling cylinders 6 has been completed. In other words, the attendant will observe, during the filling period of cylinders 6, that the pointer of gage 59 will first be considerably deviated from its original position, but will gradually return toward the same, to finally come to rest at such a distance therefrom as corresponds to the fall of the liquid level in tank 1. When the pointer thus comes to a standstill, the attendant will know that the flow of the liquid has ceased and that the cylinder has been properly filled. He may then connect cylinders 6 with discharge pipes 25.

The operation described is rendered possible by the fact that a uniform pressure is maintained in pipe 29, so that the quantity of carbonic acid gas entering tank 1, equals exactly the quantity of liquid withdrawn therefrom, the pressure of the carbonic acid gas in tank 1 being the same before and after the withdrawal of liquid therefrom. The same pressure of the carbonic acid gas is thus maintained throughout the operation of the apparatus, and the gage pointer will follow the fall of the liquid level in tank 1. The flow of the carbonic acid gas will thus influence the pointer only while filling the cylinders, upon the completion of which operation the position of the pointer is determined by the height of the liquid level in tank 1.

It will be seen that by my invention any objectionable pressure in the main storing tank is avoided irrespective of the elevation above the tank at which the discharge faucets may be located, and all leakages of the main tank, owing to high pressure, are thus avoided.

I claim:

1. A device of the character described, comprising a main tank arranged underground and adapted to contain a liquid, an auxiliary tank adapted to contain a gas, means for discharging part of the liquid from the main tank into the auxiliary tank, means for simultaneously conveying the gas from the auxiliary tank to the main tank, and a discharge faucet arranged overground and communicating with the auxiliary tank.

2. A device of the character described, comprising a main tank arranged underground and adapted to contain a liquid, an auxiliary tank adapted to contain a gas, means for discharging part of the liquid from the main tank into the auxiliary tank, means for simultaneously conveying the gas from the auxiliary tank to the main tank, a discharge faucet arranged overground and communicating with the auxiliary tank, and means for forcing the liquid from the auxiliary tank to the discharge faucet with a pressure independent from that in the main tank.

3. A device of the character described, comprising a main tank adapted to contain a liquid, an auxiliary tank arranged below the main tank, a plunger inclosed within the auxiliary tank, means for connecting the main tank to the auxiliary tank above said piston, and means for raising the piston, substantially as specified.

4. In a device of the character described, an auxiliary tank, a plunger inclosed therein, a double cylinder, pistons inclosed therein, means controlled by said pistons for admitting a pressure medium into the auxiliary tank below the plunger, and means also controlled by the pistons for subsequently discharging the pressure medium from the auxiliary tank, substantially as specified.

5. In a device of the character described, an auxiliary tank having a plunger and adapted to contain a liquid above the plunger, a double cylinder, pistons inclosed therein, first means controlled by said pistons for admitting a pressure medium into the auxiliary tank below the plunger to raise the plunger and thereby discharge the liquid from the tank, second means controlled by the pistons for subsequently discharging the pressure medium from the auxiliary tank to permit the plunger to descend, and third means also controlled by the pistons for admitting an indifferent gas into the tank above the plunger, substantially as specified.

6. In a device of the character described, a main tank, an auxiliary tank, a pair of cylinders, a neck connecting the same, pistons contained in the cylinders and controlling communication between the main tank and auxiliary tank, a rod connecting the pistons and passing through the neck, a liquid intermediate the pistons, and means on the neck for controlling the flow of said liquid, substantially as specified.

7. A device of the character described, comprising a main tank, a supply barrel, a liquid pipe and a gas pipe connecting the tank and barrel, a valve-controlled housing communicating with the liquid pipe and provided with means for starting a siphonic flow of the liquid from the barrel into the tank, and means for automatically closing the valve when the barrel is emptied, substantially as specified.

8. In a device of the character described, a main tank adapted to contain a liquid, an auxiliary tank adapted to communicate with the main tank, a discharge faucet adapted to communicate with the auxiliary tank, and a liquid return pipe connecting the faucet with the main tank, substantially as specified.

9. In a device of the character described, a main tank adapted to contain a liquid, an auxiliary tank adapted to communicate with the main tank, a discharge faucet, a first pipe connecting the faucet with the auxiliary tank, and a second pipe surrounding the first pipe and connecting the faucet with the main tank, substantially as specified.

10. In a device of the character described, a main tank, an auxiliary tank, a discharge faucet communicating with the auxiliary tank and having a discharge nozzle, a first valve controlling said nozzle, a return pipe connecting the faucet with the main tank, and a second valve connected to the first valve and controlling said pipe, substantially as specified.

Signed by me at Dusseldorf, Germany this twenty second day of October 1907.

WILHELM HEER.

Witnesses:
  WILHELM FLASCHE,
  CLEMENS HICKMANN.